C. H. FOLTMER.
PISTON RING.
APPLICATION FILED DEC. 27, 1919.
1,348,274.
Patented Aug. 3, 1920.
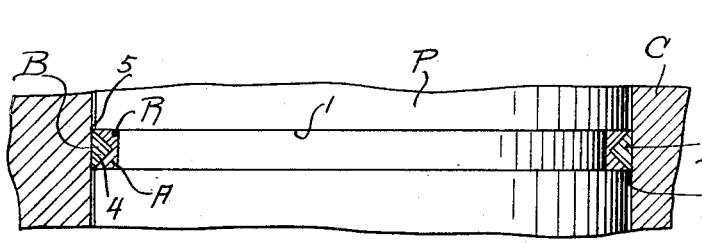
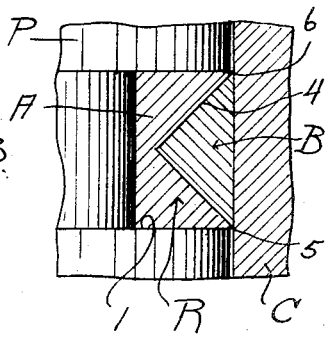
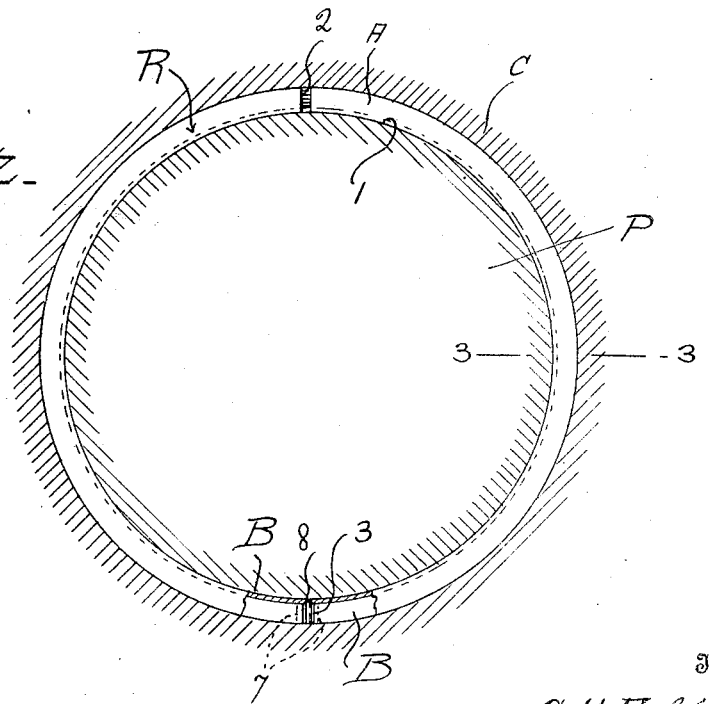
Inventor
C. H. Foltmer
By Watson E. Coleman
Attorney

UNITED STATES PATENT OFFICE.

CONRAD H. FOLTMER, OF WRAY, COLORADO.

PISTON-RING.

1,348,274.  Specification of Letters Patent.  Patented Aug. 3, 1920.

Application filed December 27, 1919. Serial No. 347,714.

*To all whom it may concern:*

Be it known that I, CONRAD H. FOLTMER, a citizen of the United States, residing at Wray, in the county of Yuma and State of Colorado, have invented certain new and useful Improvements in Piston-Rings, of which the following is a specification, reference being had to the accompanying drawings.

This invention relates to certain improvements in piston rings, and it is an object of the invention to provide a device of this general character having novel and improved means whereby the same will have requisite contact with the internal wall of the cylinder during all periods of the operation of the piston and thereby effecting a desired seal of the cylinder chamber for preventing the wastage of gasolene or other liquid used for the purposes of explosure and lubrication and thus getting a maximum of power and enabling the piston to perform its function with greater efficiency.

Another object of the invention is to provide a novel and improved ring of this general character constructed in a manner to prevent effectually the passage of oil thereby and which comprises in its construction two substantially concentric members, one of which constitutes a male member and the other a female member, and wherein the female member has restricted marginal portions for contact with the internal wall of the cylinder.

The invention consists in the details of construction and in the combination and arrangement of the several parts of my improved piston ring whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view partly in section and partly in side elevation showing a piston ring constructed in accordance with an embodiment of my invention and in applied position.

Fig. 2 is a view in plan of my improved piston ring as herein disclosed with a portion of the female member broken away, the adjacent portions of a cylinder and piston being diagrammatically indicated; and Fig. 3 is an enlarged fragmentary sectional view taken through my improved ring as herein disclosed with the coacting portions of the cylinder and piston shown in fragment.

As disclosed in the accompanying drawings, P denotes a piston mounted for rectilinear movement within a cylinder C, and 1 denotes an annular groove or channel disposed around the piston P and in which is seated my improved ring R. My improved ring R comprises two substantially annular members A and B, the inner member A constituting a female member, and the outer member B constituting a male member. Each of the members A and B is split transversely as indicated at 2 and 3 and when the members A and B are assembled, said split portions 2 and 3 are substantially diametrically disposed.

As is particularly illustrated in Figs. 1 and 2 of the accompanying drawings, it is to be noted that the face of the female member A opposed to the male member B is provided with the continuous circumferentially disposed groove or channel 4, V-shape in cross section with its apex inwardly directed, and the side walls of said channel perpendicularly related. It is also to be particularly noted that the major depth of the channel 4 is substantially equal to four-fifths of the width of the assembled ring R or of the female member A. The walls of the channel 4 have their outer edge or marginal portions extending to the outer corners of said female member A, resulting in the knife or feather edges 5.

The male member B is also V-shape in cross section to snugly fit within the groove 4 of the female member A and the inclined walls or faces of the female member A are also substantially perpendicularly related and extend to the outer corners of the male member B to afford the knife or feather edges 6. When the members A and B are assembled and in working position, the outer face of the member B is flush with the edges 5 of the female member A.

The opposed ends of the split 3 in the member B are provided with the notches or recesses 7, and extending between the ends of the member B at the split 3 is a pin 8 extending outwardly from the member A.

The pin 8 coacts with the ends of the member B at the split 3 to hold the members A and B against circumferential movement, one with respect to the other, and the functioning of the pin 8 is facilitated by the recesses 7.

The ring R engages the wall of the cylinder C to produce an effective seal for preventing the wastage of gasolene, kerosene, or other liquids used for the purpose of explosion or lubrication and which results in the maximum of power and enables the piston to perform its functions with greater efficiency, and the knife or feather edges 5 and 6 of the members A and B operate to prevent the passage of oil thereby and also to prevent carbon from getting under the piston ring R which would otherwise impair the efficiency of the ring.

From the foregoing description, it is thought to be obvious that a piston ring constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. As a new article of manufacture, a piston ring comprising two substantially concentric members, one of said members constituting a male member and the second of said members constituting a female member and being expansible, the male member being V-shape in cross section, with its inclined faces extending to the outer corners of the member to provide feather edges, the opposed face of the female member being provided with a groove substantially V-shape in cross section, with the side walls thereof extending to the outer corners of said female member to provide feather edges, the outer face of the male member being flush with the feather edges of the female member when said members are assembled.

2. As a new article of manufacture, a piston ring comprising two substantially concentric members, one of said members constituting a male member and the second of said members constituting a female member, said members being expansible, the male member being V-shape in cross section, with its inclined faces extending to the outer corners of the member to provide feather edges, the opposed face of the female member being provided with a groove substantially V-shape in cross section, with the side walls thereof extending to the outer corners of said female member to provide feather edges, the outer face of the male member being flush with the feather edges of the female member when said members are assembled, the major depth of the groove in the female member being substantially four-fifths of the width of the member.

3. As a new article of manufacture, a piston ring comprising two substantially concentric expansion members, one of said members constituting a male member and the second of said members constituting a female member, the male member being V-shape in cross section, with its inclined faces extending to the outer corners of the member to provide feather edges, the opposed face of the female member being provided with a groove substantially V-shape in cross section, with the side walls thereof extending to the outer corners of said female member to provide feather edges, the outer face of the male member being flush with the feather edges of the female member when said members are assembled, each of said members being transversely split.

4. As a new article of manufacture, a piston ring comprising two substantially concentric expansion members, one of said members constituting a male member and the second of said members constituting a female member, the male member being V-shape in cross section with its inclined faces extending to the outer corners of the member to provide feather edges, the opposed face of the female member being provided with a groove substantially V-shape in cross section, with the side walls thereof extending to the outer corners of said female member to provide feather edges, the outer face of the male member being flush with the feather edges of the female member when said members are assembled, each of said members being transversely split, and means carried by one of the members and coacting with the second member for holding the same against relative circumferential movement.

In testimony whereof I hereunto affix my signature.

CONRAD H. FOLTMER.